United States Patent
Zhang et al.

(10) Patent No.: US 12,056,381 B2
(45) Date of Patent: Aug. 6, 2024

(54) DATA PROCESSING METHOD AND DATA PROCESSING DEVICE

(71) Applicant: SAMSUNG ELECTRONICS CO., LTD., Suwon-si (KR)

(72) Inventors: Kun Zhang, Shaanxi (CN); Zhao Chen, Shaanxi (CN); Kun Dou, Shaanxi (CN); Bei Qi, Shaanxi (CN); Zhijun Liu, Shaanxi (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/746,719

(22) Filed: May 17, 2022

(65) Prior Publication Data
US 2023/0153006 A1 May 18, 2023

(30) Foreign Application Priority Data
Nov. 16, 2021 (CN) .......................... 202111357613.7

(51) Int. Cl.
*G06F 12/00* (2006.01)
*G06F 3/06* (2006.01)
(52) U.S. Cl.
CPC .......... *G06F 3/0643* (2013.01); *G06F 3/0604* (2013.01); *G06F 3/064* (2013.01); *G06F 3/0659* (2013.01); *G06F 3/0683* (2013.01)
(58) Field of Classification Search
CPC ...... G06F 3/0643; G06F 3/0604; G06F 3/064; G06F 3/0659; G06F 3/0683;
(Continued)

(56) References Cited

U.S. PATENT DOCUMENTS

| 10,318,175 B2 | 6/2019 | Huo et al. |
| 10,445,022 B1 | 10/2019 | Qui et al. |

(Continued)

FOREIGN PATENT DOCUMENTS

| CN | 105095287 | 9/2018 |
| CN | 106708427 | 5/2019 |

(Continued)

OTHER PUBLICATIONS

Siyong Dong, "Option of Compaction Priority", Posted Jan. 29, 2016, https://rocksdb.org/blog/2016/01/29/compaction_pri.html.
(Continued)

*Primary Examiner* — Mardochee Chery
(74) *Attorney, Agent, or Firm* — F. Chau & Associates, LLC

(57) ABSTRACT

A data processing method for a log structured merge (LSM) tree includes selecting SST files to be compressed and merged in a current layer and a next layer, sequentially reading the SST files to be compressed and merged in the current layer and the next layer from a first storage device and sequentially writing the SST files in a second storage device, randomly reading the SST files to be compressed and merged from the second storage device into a memory according to key sequence numbers of data blocks included in the SST files to be compressed and merged, and performing compression and merge processing on the SST files to be compressed and merged. Sequential and random read and write speed of the second storage device is higher than that of the first storage device.

19 Claims, 13 Drawing Sheets

(58) Field of Classification Search
CPC .... G06F 3/0638; G06F 3/0679; G06F 3/0608; G06F 3/061; G06F 16/174; G06F 16/182; G06F 16/22
USPC .......................................................... 711/154
See application file for complete search history.

(56) References Cited

U.S. PATENT DOCUMENTS

| | | | |
|---|---|---|---|
| 2018/0032580 A1 | 2/2018 | Guz | |
| 2018/0150472 A1 | 5/2018 | Chen et al. | |
| 2018/0349095 A1 | 12/2018 | Wu et al. | |
| 2020/0225882 A1* | 7/2020 | Li | G06F 12/0246 |
| 2022/0103622 A1* | 3/2022 | Camargos | G06F 11/301 |

FOREIGN PATENT DOCUMENTS

| | | | | |
|---|---|---|---|---|
| CN | 113688096 A | * | 11/2021 | G06F 3/0608 |
| KR | 10-2018-0012188 | | 2/2018 | |
| WO | WO-2021061173 A1 | * | 4/2021 | |

OTHER PUBLICATIONS

Mark Callaghan, "Small Datum: Compaction priority in RocksDB", Feb. 9, 2016, https://smalldatum.blogspot.com/2016/02/compaction-priority-in-rocksdb.html.

Tianshimeng, "Principles of Rocksdb Compaction", Dec. 16, 2021, https://www.cnblogs.com/cchust/p/6007486.html.

Siying Dong, et al., "Optimizing Space Amplification in RocksDB", CIDR 2017, 8th Biennial Conference on Innovative Data Systems Research (CIDR '17) Jan. 8-11, 2017, Chaminade, California, USA.

"KV SSD Highlights of Open Data Center Summit 2019", Aug. 10, 2019, https://www.odcc.org.cn/news/p-1160060784686317569.html.

Niv Dayan, et al., "Dostoevsky: Better Space-Time Trade-Offs for LSM-Tree Based Key-Value Stores via Adaptive Removal of Superfluous Merging", SIGMOD'18, Jun. 10-15, 2018, Houston, TX, USA © 2018 Association for Computing Machinery.

* cited by examiner

DATA PROCESSING METHOD AND DATA PROCESSING DEVICE

CROSS-REFERENCE TO RELATED APPLICATIONS

This application claims priority under 35 U.S.C. § 119 to Chinese Patent Application No. 202111357613.7 filed on Nov. 16, 2021, the disclosure of which is incorporated by reference herein in its entirety.

TECHNICAL FIELD

Embodiments of the present disclosure relate to data compression, and more particularly, to a data processing method and a data processing device for a log structured merge (LSM) tree.

DISCUSSION OF RELATED ART

A log structured merge (LSM) tree is a data storage architecture commonly used by mainstream database engines. An LSM tree may be composed of several layers of data sets. A data volume of each layer may increase exponentially according to the number of the layer, and may be set with a maximum capacity.

In a process of continuously storing data in a LSM database, when a data volume in a certain layer exceeds a maximum capacity of the layer, a compression thread may be triggered, and the compression thread may merge and compress SST files of the current layer.

SUMMARY

Embodiments of the present disclosure provide a data processing method and a data processing device for a log structured merge (LSM) tree, which increase the efficiency of data compression and merging of the LSM tree.

According to an embodiment of the present disclosure, a data processing method for a log structured merge tree is provided. The data processing method may include: selecting SST files to be compressed and merged in a current layer and a next layer; sequentially reading the SST files to be compressed and merged in the current layer and the next layer from a first storage device and sequentially writing the SST files in a second storage device; randomly reading the SST files to be compressed and merged from the second storage device into a memory according to key sequence numbers of data blocks included in the SST files to be compressed and merged, and performing compression and merge processing on the SST files to be compressed and merged, wherein sequential and random read and write performance of the second storage device is higher than that of the first storage device.

In an embodiment, after the SST files to be compressed and merged in the current layer and the next layer are sequentially read from the first storage device and sequentially written into the second storage device, the method further includes: updating storage paths of the SST files to be compressed and merged in the second storage device, in a mapping table; the randomly reading the SST files to be compressed and merged from the second storage device into the memory according to the key sequence numbers of the data blocks included in the SST files to be compressed and merged includes: randomly reading the SST files to be compressed and merged from the second storage device into the memory according to the key sequence numbers of the data blocks included in the SST files to be compressed and merged, according to the storage paths of the SST files to be compressed and merged in the second storage device.

According to embodiments, by converting a random reading of a slow storage device into a sequential reading of the slow storage device and a random reading of a fast storage device, the sequential reading performance of the slow storage device and the random reading performance of the fast storage device are fully utilized, thereby increasing the efficiency of data compression.

In an embodiment, the mapping table includes: a corresponding relationship between identification numbers of the SST files to be compressed and merged and the storage paths of the SST files to be compressed and merged in the second storage device.

According to embodiments, by updating the mapping table, a compression thread may quickly locate data to be compressed based on the mapping table, thereby increasing the reading speed.

In an embodiment, the first storage device is a magnetic disk, and the second storage device is a solid state drive (SSD).

In an embodiment, the first storage device is a slow NAND in a solid state drive, and the second storage device is a fast NAND in the solid state drive.

In an embodiment, the sequentially reading the SST files to be compressed and merged in the current layer and the next layer from the first storage device and sequentially writing the SST files in the second storage device includes: in response to a pre-read data command, sequentially reading the SST files to be compressed and merged in the current layer and the next layer from the first storage device and sequentially writing the SST files into the second storage device.

According to embodiments, by providing a user with an application interface for operating such as a database (located in a memory on a host side), the database may sequentially obtain data requested by the user to the fast storage device for database compression.

According to an embodiment of the present disclosure, a data processing device for a log structured merge tree is provided. The data processing device may include: a selecting module, configured to select SST files to be compressed and merged in a current layer and a next layer; a prefetching module, configured to sequentially read the SST files to be compressed and merged in the current layer and the next layer from a first storage device and sequentially write the SST files in a second storage device; and a reading module, configured to: randomly read the SST files to be compressed and merged from the second storage device into a memory according to key sequence numbers of data blocks included in the SST files to be compressed and merged, and perform compression and merge processing on the SST files to be compressed and merged, wherein sequential and random read and write performance of the second storage device is higher than that of the first storage device.

In an embodiment, the data processing device further includes a mapping table module, configured to update storage paths of the SST files to be compressed and merged in the second storage device, in a mapping table;

In an embodiment, the reading module is further configured to: randomly read the SST files to be compressed and merged from the second storage device into the memory according to the key sequence numbers of the data blocks included in the SST files to be compressed and merged, according to the storage paths of the SST files to be compressed and merged in the second storage device.

In an embodiment, the mapping table module is further configured to store a corresponding relationship between identification numbers of the SST files to be compressed and merged and the storage paths of the SST files to be compressed and merged in the second storage device.

In an embodiment, the first storage device is a magnetic disk, and the second storage device is a solid state drive (SSD).

In an embodiment, the first storage device is a slow NAND in a solid state drive, and the second storage device is a fast NAND in the solid state drive.

In an embodiment, the prefetching module is further configured to: in response to a pre-read data command, sequentially read the SST files to be compressed and merged in the current layer and the next layer from the first storage device and sequentially writing the SST files into the second storage device.

According to an embodiment of the present disclosure, a computer program product is provided, and instructions in the computer program product are executed by at least one processor in an electronic device to perform the data processing method as described above.

According to an embodiment of the present disclosure, a computer-readable storage medium storing instructions is provided, wherein the instructions, when executed by a processor, cause the processor to perform the data processing method as described above.

According to an embodiment of the present disclosure, an electronic device is provided, wherein the electronic device includes: a processor; a storage, including a first storage device and a second storage device, and storing instructions, wherein the instructions, when executed by the processor, cause the processor to perform the data processing method as described above.

According to an embodiment of the present disclosure, an electronic system is provided, and the electronic system comprises: a memory used as a main storage device; and a storage device, a main processor configured to control at least one of the memory and the storage device to process data according to the data processing method as described above.

According to an embodiment of the present disclosure, a host storage system is provided, and the host storage system comprises: a host; and a storage device, wherein at least one of the host and the storage device is configured to process data according to the data processing method as described above.

According to an embodiment of the present disclosure, a storage system is provided, and the storage system comprises: a storage device; and a memory controller configured to control the storage device to process data according to the data processing method as described above.

According to an embodiment of the present disclosure, an universal flash memory system is provided, and the universal flash memory comprises: an universal flash memory host; an universal interface; and an universal flash memory device configured to communicate with the universal flash memory host via a universal flash memory interface, wherein at least one of the universal flash memory host and the universal flash memory device is configured to process data according to the data processing method as described above.

According to an embodiment of the present disclosure, a storage system is provided, and the storage system comprises: a memory device; and a memory controller communicating with the memory device through a channel and configured to control the memory device to process data according to the data processing method as described above.

According to an embodiment of the present disclosure, a data center is provided, and the data center comprises: an application server; and a storage server configured to communicate with the application server over a network, wherein at least one of the application server and the storage server is configured to process data according to the data processing method as described above.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
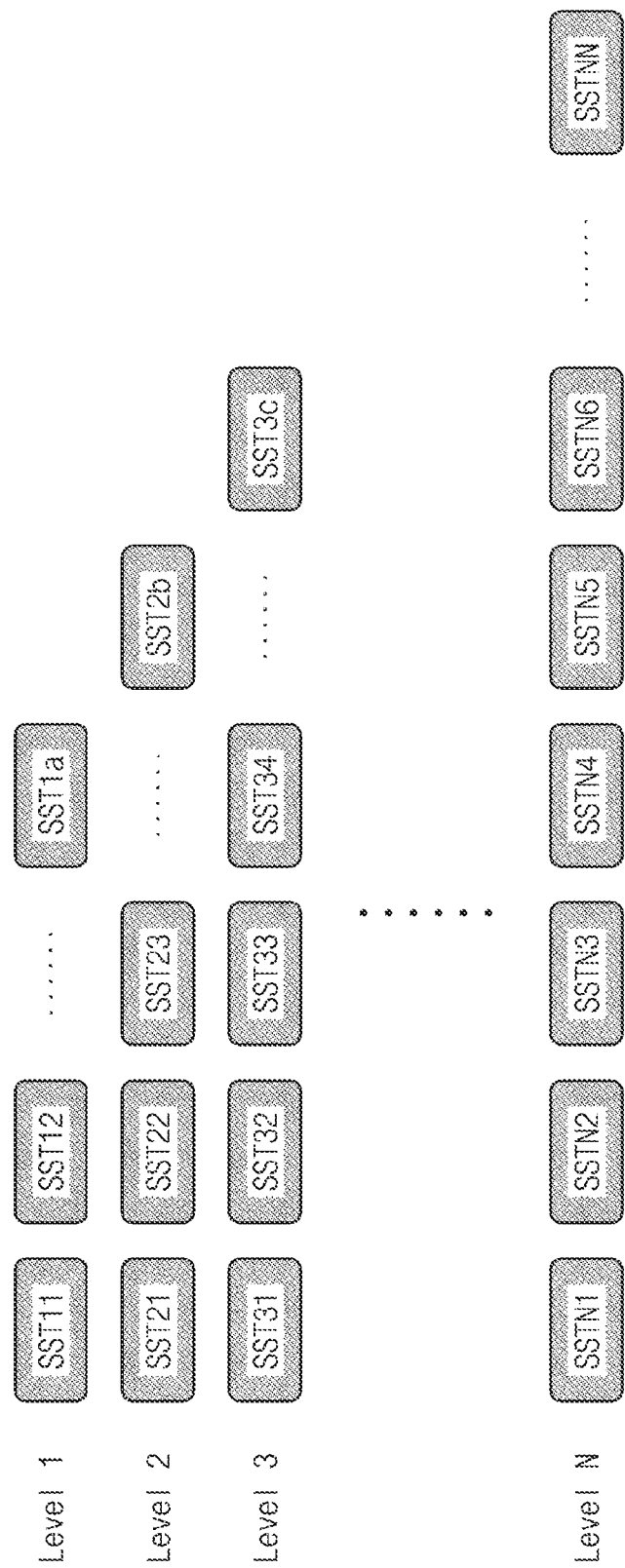
FIG. 1 is a schematic diagram showing an architecture of a LSM tree.

Embodiments of the present disclosure will be described more fully hereinafter with reference to the accompanying drawings. Like reference numerals may refer to like elements throughout the accompanying drawings.

As used herein, the singular forms "a", "an" and "the" are intended to include the plural forms as well, unless the context clearly indicates otherwise.

The terms "comprising", "including" and "having" indicate that the stated features, quantities, operations, components, elements and/or combinations thereof exist, but do not exclude the presence or addition of one or more other features, quantities, operations, components, elements and/or combinations thereof.

It will be understood that the terms "first," "second," "third," etc. are used herein to distinguish one element from another, and the elements are not limited by these terms. Thus, a "first" element in an embodiment may be described as a "second" element in another embodiment.

The term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a schematic diagram showing an architecture of a log structured merge (LSM) tree.

Referring to FIG. 1, the LSM tree is composed of several layers (e.g., Level 1-Level N) of data sets, in which N is a positive integer. A data volume of each layer increases exponentially according to a number of the layer, and is set with a maximum capacity.

Figure 2:
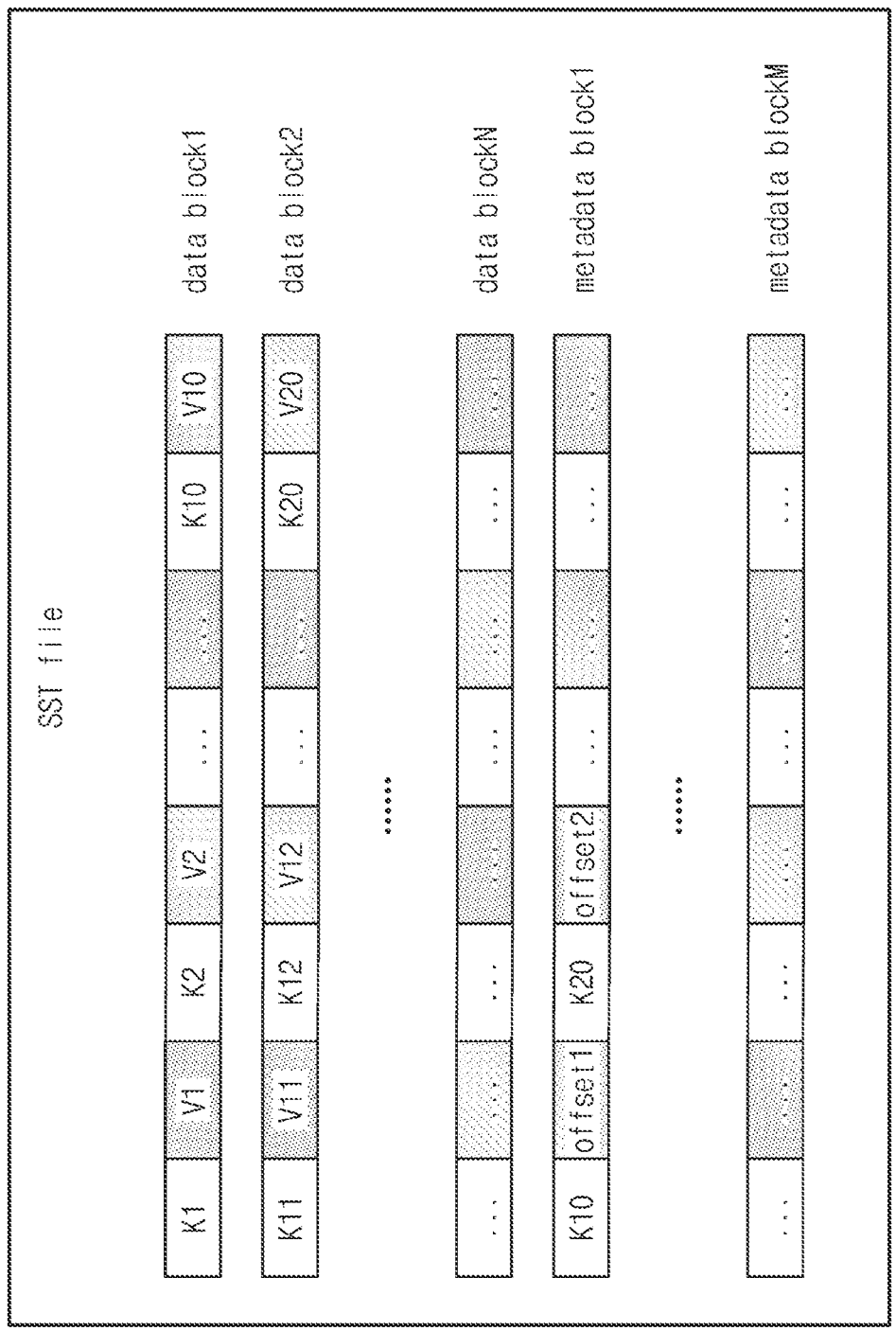
FIG. 2 is a diagram showing an SST file format of a LSM tree.

FIG. 2 is a diagram showing an SST file format of a LSM tree.

As shown in FIG. 2, the LSM tree exists in a form of multiple SST files on a magnetic disk. Each layer includes multiple SST files. Each SST file contains several data blocks and several metadata blocks. Key-value pairs within each data block are arranged in order according to sizes of key sequence numbers.

Referring to a comparative example, in a process of continuously storing data in a LSM database, when a data volume in a certain layer exceeds a maximum capacity of the layer, a compression thread may be triggered, and the compression thread may merge and compress SST files of the current layer.

When performing merging and compressing, SST files that may be compressed and merged in a current layer and a next layer may be selected first. As shown in FIG. 1, a data volume of Level 1 exceeds a maximum capacity, and SST files of which key sequence numbers overlap in Level 1 and the next layer Level 2 are determined, and the SST files of which key sequence numbers overlap are then randomly read from a storage device into a memory in an order of the key sequence numbers.

However, sequential read and write performance of a common storage device is typically more efficient than random read and write performance thereof, and a gap between random read and write performance of a single thread and sequential read and write performance of the single thread may be large, while a compressing and merging process is completed by one thread. Therefore, the random read performance in a compressing and merging process according to a comparative example may have a significant impact on the performance of compression.

Figure 3:
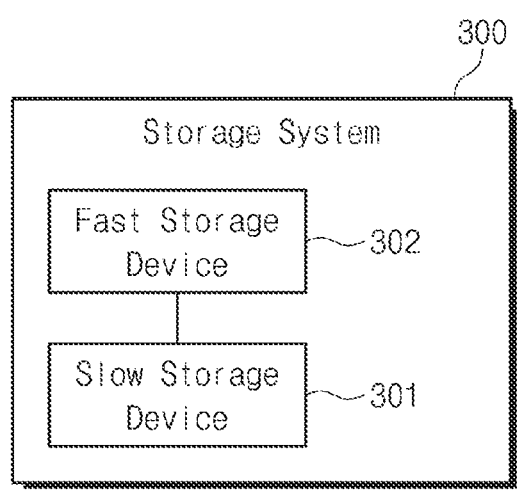
FIG. 3 is a schematic diagram showing a storage system used in a compression process for a LSM tree according to an embodiment of the present disclosure.

FIG. 3 is a schematic diagram showing a storage system used in a compression process for a LSM tree according to an embodiment of the present disclosure.

Embodiments of the present disclosure provide a data processing solution for a log structured merge (LSM) tree.

For example, as shown in FIG. 3, in an embodiment, a storage system 300 includes a fast storage device with high read and write performance (e.g., speed). The storage system includes a slow storage device 301 (also referred to as a first storage device) and a fast storage device 302 (also referred to as a second storage device). The slow storage device 301 is relatively slower (e.g., has a relatively slower read and write speed) than the fast storage device 302. The slow storage device 301 is used to store data of the LSM tree in a form of SST files, and the fast storage device 302 is used as a transitional storage device between the slow storage device 301 and a memory. When compressing and merging the LSM tree, data to be compressed is first sequentially read from the slow storage device 301 to the fast storage device 302, and the data to be compressed is then randomly read from the fast storage device 302 to the memory according to key sequence numbers of the data to be compressed. As a result, the speed of reading data from the original storage system into the memory, and the compression efficiency, may be increased.

Hereinafter, according to various embodiments of the present disclosure, methods and devices will be described in detail with reference to the accompanying drawings.

Figure 4:
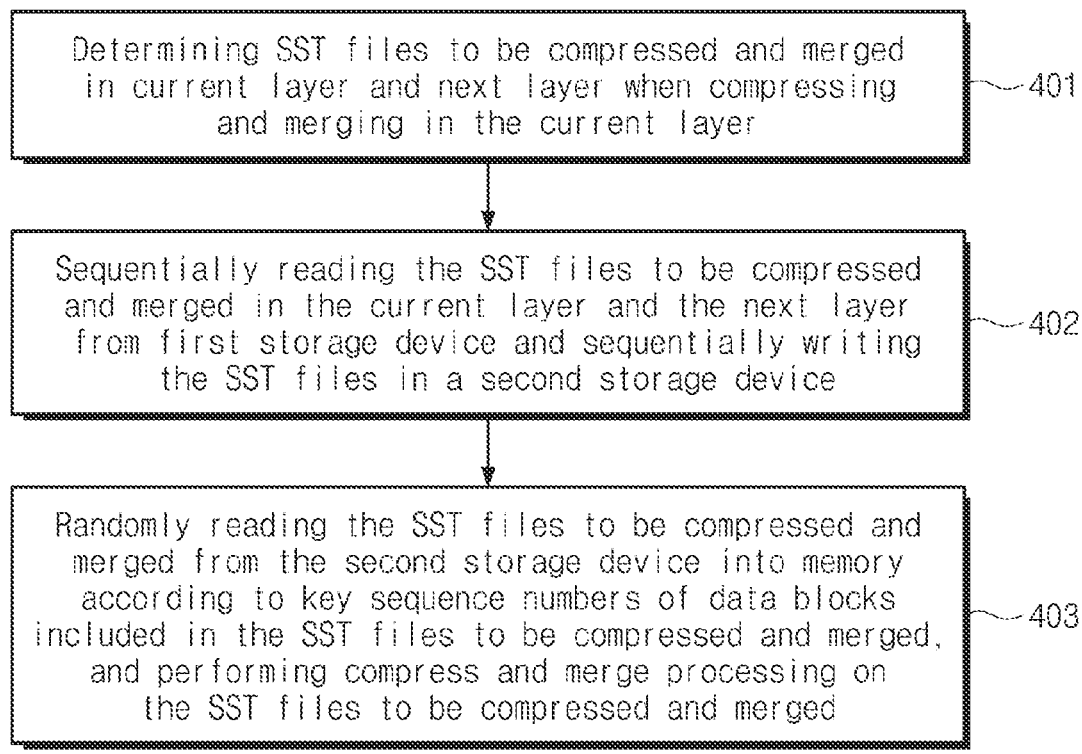
FIG. 4 is a flowchart showing a data processing method according to an embodiment of the present disclosure.

FIG. 4 is a flowchart showing a data processing method according to an embodiment of the present disclosure.

According to an embodiment of the present disclosure, the data processing method of FIG. 4 may be performed for a LSM key-value storage system. The data processing method shown in FIG. 4 transforms the existing "random read of a slow storage device" into "sequential read of the slow storage device and random read of a fast storage device" by utilizing the fast storage device. As a result, the speed of reading data from the storage system into the memory may be increased.

Referring to FIG. 4, in operation 401, when compressing and merging a current layer, SST files to be compressed and merged in the current layer and a next layer are determined. For example, when data size of SST files of a certain layer in a LSM tree exceeds a maximum capacity of the layer, a compression thread will be triggered, and a compression picker may select SST files to be compressed in a current layer and a next layer.

For example, as shown in FIG. 1, if data volume of a current layer Level 1 is greater than the maximum capacity of the layer, a compression task may be triggered. First, it may be determined whether each SST file in Level 1 has a key sequence number that overlaps with a key sequence number in each SST file in Level 2.

Figure 5:
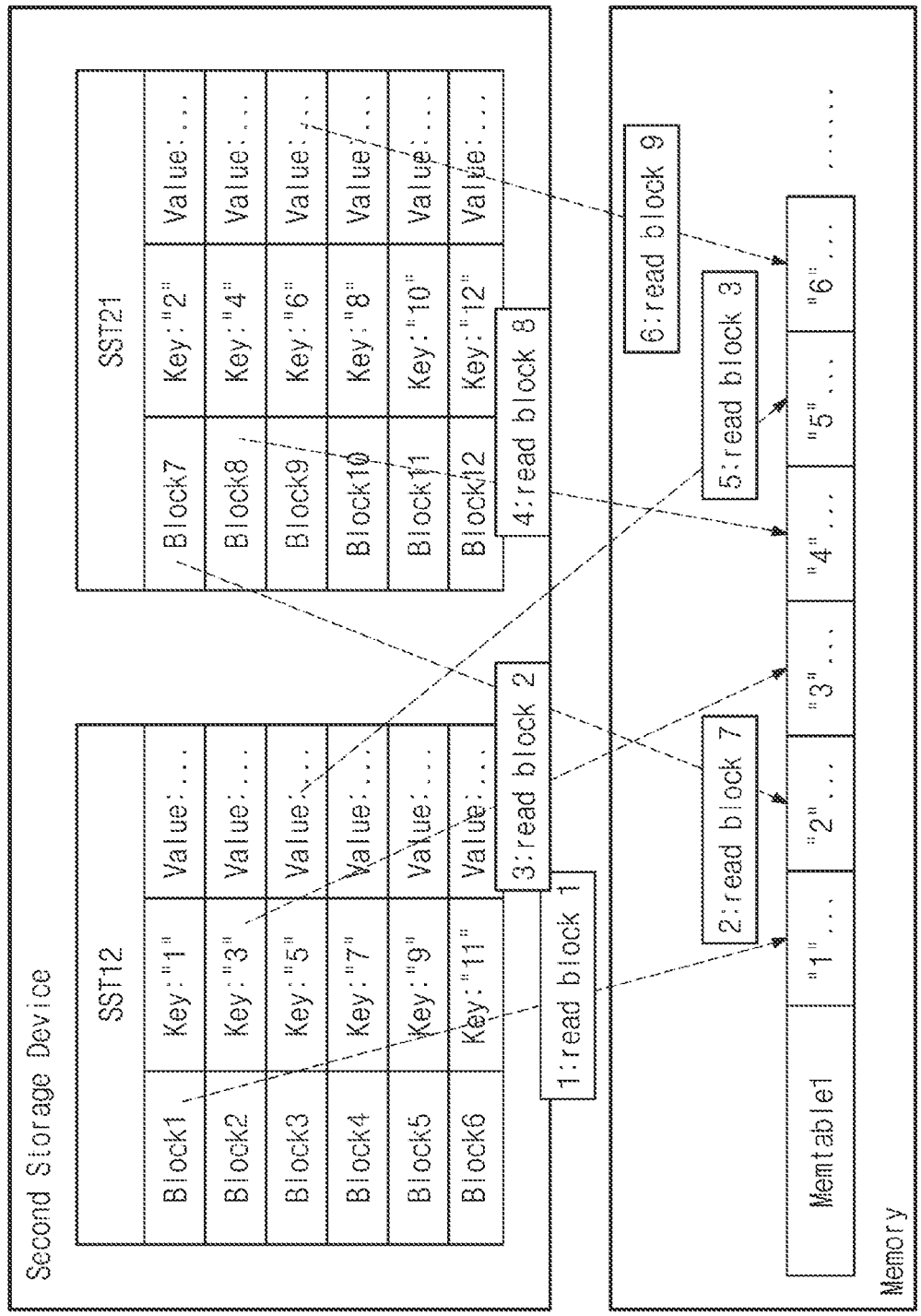
FIG. 5 is a schematic diagram showing that SST files to be compressed and merged are randomly read into a memory.

FIG. 5 is a schematic diagram showing that SST files to be compressed and merged are randomly read into a memory.

As shown in FIG. 5, key sequence number ranges in SST12 file in Level 1 and SST21 in Level 2 overlap, and thus, SST12 and SST21 are selected as SST files to be compressed and merged.

Referring again to FIG. 4, in operation 402, the SST files to be compressed and merged in the current layer and the next layer are sequentially read from the first storage device and sequentially written into the second storage device. As an example, after the compression picker selects the SST files to be compressed, the selected SST files are sequentially read from the first storage device by file and the selected SST files are sequentially written into the second storage device.

Here, the first storage device may be a common storage device, such as, for example, a storage device used in the key-value storage system. The second storage device may be a storage device with high sequential and random read and write performance (e.g., high sequential and random read and write speed). For example, the first storage device may be a common solid state drive such as a NVMe SSD, and the second storage device may be a Z-SSD with Z-NAND. The first storage device may also be, for example, a common hard disk, and the second storage device may be, for example, an SSD. However, the above are only examples, and the embodiments of the present disclosure are not limited thereto.

According to embodiments, the storage system 300 may be one physical device in the form of integrating the slow storage device 301 and the fast storage device 302, or may be two separate physical devices that include the slow storage device 301 and the fast storage device 302. However, embodiments of the present disclosure are not limited thereto.

In an embodiment, a pre-defined command line interface may be provided to the host side (for example, a server system). For example, an application interface for the second storage device may be pre-defined, that is, a pre_read data command In this way, after the compression thread is triggered, the host side uses the pre_read data command to prefetch the SST files to be compressed and merged into the second storage device, that is, sequentially read the SST files to be compressed and merged from the first storage device and sequentially write the SST files into the second storage device for database compression.

In operation 403, the SST files to be compressed and merged are randomly read from the second storage device to the memory according to the key sequence numbers of the data blocks included in the SST files to be compressed, and the compression and merge processing are performed on the SST files to be compressed and merged.

As shown in FIG. 5, after files to be compressed and merged (SST12 and SST21) are written into the second storage device, the files may be randomly read into the memory. For example, SST12 includes data blocks Block1 to Block6, SST21 includes data blocks Block7 to Block12, and the key sequence number ranges of the data blocks stored in SST12 and SST21 overlap. By using index information (containing key sequence number information of the data blocks in the SSTs) of the LSM tree in the memory, the data blocks are read to the memory in sequence according to the order of the key sequence numbers of the data blocks. For example, the reading order is Block1, Block7, Block2, Block8, Block3, Block9, Block4, Block10, Block5, Block11, Block12. Since the random read and write performance (e.g., speed) of the second storage device is higher, even when the data blocks of the two files SST12 and SST21 are read randomly, the read speed is still increased, and the efficiency of compression and merging is increased.

In an embodiment, after the SST files to be compressed and merged in the current layer and the next layer are sequentially read from the first storage device and written in the second storage device, storage paths of the SST files to be compressed and merged in the second storage device are updated in a mapping table. The mapping table is used to maintain the storage paths of the SST files to be compressed and merged in the first storage device in the second storage device. When randomly reading the SST files to be compressed and merged into the memory, the read data may be located by using the storage paths of the SST files to be compressed and merged in the mapping table in the second storage device.

In an embodiment, the mapping table includes a corresponding relationship between identification numbers of the SST files to be compressed and merged and the storage paths of the SST files to be compressed and merged in the second storage device.

Figure 6:
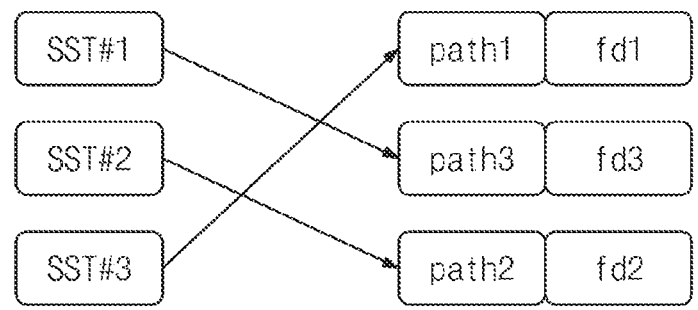
FIG. 6 is a schematic diagram showing a mapping table structure according to an embodiment of the present disclosure.

FIG. 6 is a schematic diagram showing a mapping table structure according to an embodiment of the present disclosure.

As an example, a mapping table structure shown in FIG. 6 is referred to herein. In FIG. 6, the mapping table includes names of SST files to be compressed and merged in the first storage device, storage paths of the SST files to be compressed and merged in the second storage device, and descriptors fd (file description) of the SST files to be compressed and merged. However, the above mapping structure is only an example, and the present disclosure is not limited thereto.

After the SST files to be compressed and merged are read into the memory for compression and merging, a new SST file is generated and the new SST file is sequentially written into the next layer of the first storage device.

According to an embodiment of the present disclosure, the compression thread is not directly based on the data in the slow storage device, but rather, is based on the data copy in the fast storage device. As a result, a slow random read may be transformed into a fast sequential read, thereby increasing compression efficiency.

In addition, the compressed SST files may be periodically deleted from the second storage device. For example, the data stored in the second storage device for a predetermined period of time may be deleted to save storage space.

Referring to a comparative example, the memory may cache the data blocks of the LSM tree, so as to increase the reading speed when reading again. However, in the LSM tree structure, the SST file will not be updated, and all new data is written to a new SST file in an appended manner. The old data may be deleted after the compression process. As a result, the life cycle of the SST file is short, especially in a high-speed writing scenario. The SST file may be compressed after being read for the first time, and the original SST file is deleted after compression. Therefore, in a case in which the heat data is not clearly distinguished, the memory cache may be completely invalid and does not play an acceleration role.

Embodiments of the present disclosure may effectively solve such a cache invalidation issue based on the fast sequential and random read and write performance (e.g., speed) of the second storage device.

Figure 7:
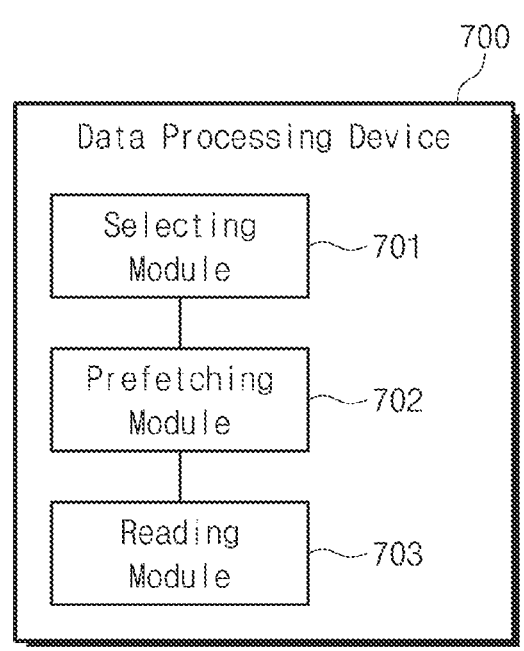
FIG. 7 is a block diagram showing a data processing device according to an embodiment of the present disclosure.

FIG. 7 is a block diagram showing a data processing device according to an embodiment of the present disclosure.

Referring to FIG. 7, the data processing device 700 may include a selecting module 701, a prefetching module 702, and a reading module 703. Each module in the data processing device 700 may be implemented by one or more physical or software modules, and the name of the corresponding module may vary according to the type of the module. Each module may be implement using, for example, a circuit. In various embodiments, some modules in the data processing device 700 may be omitted, or additional modules may also be included. In addition, modules/elements according to various embodiments of the present disclosure may be combined to form a single entity, and thus may equivalently perform the functions of the corresponding modules/elements before the combination.

The selecting module 701 is configured to select SST files to be compressed and merged in a current layer and a next layer.

The prefetching module 702 is configured to sequentially read the SST files to be compressed and merged in the current layer and the next layer from a first storage device and sequentially write the SST files in a second storage device.

The reading module 703 is configured to randomly read the SST files to be compressed and merged from the second storage device into a memory according to key sequence numbers of data blocks included in the SST files to be compressed and merged, and perform compression and merge processing on the SST files to be compressed and merged.

Herein, sequential and random read and write performance (e.g., speed) of the second storage device is higher than that of the first storage device.

Alternatively, the first storage device may be a magnetic disk, and the second storage device may be a solid state drive (SSD).

Alternatively, the first storage device may be a slow NAND in a solid state drive, and the second storage device may be a fast NAND in the solid state drive.

Figure 8:
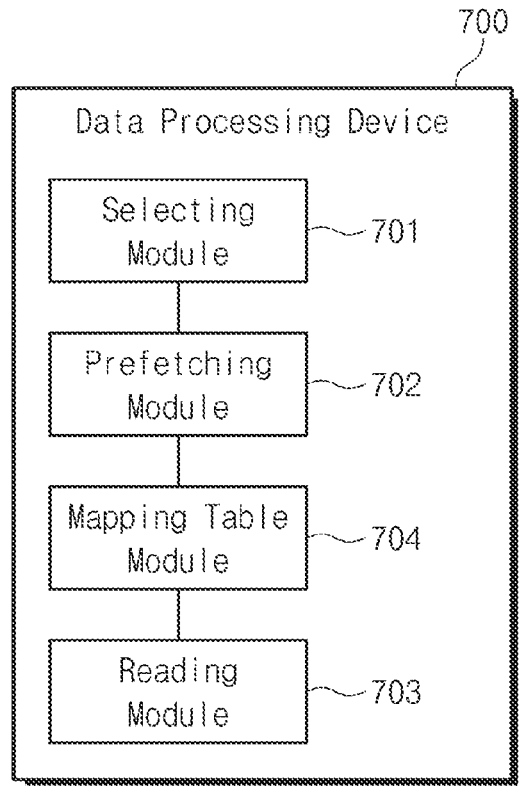
FIG. 8 is another block diagram showing a data processing device according to an embodiment of the present disclosure.

FIG. 8 is another block diagram showing a data processing device according to an embodiment of the present disclosure.

Alternatively, as shown in FIG. 8, the device 700 further includes a mapping table module 704 configured to update storage paths of the SST files to be compressed and merged in the second storage device in a mapping table.

The reading module 703 is further configured to randomly read the SST files to be compressed and merged from the second storage device into the memory according to the key sequence numbers of the data blocks included in the SST files to be compressed and merged, according to the storage paths of the SST files to be compressed and merged in the second storage device.

Alternatively, the mapping table module 704 is further configured to store a corresponding relationship between identification numbers of the SST files to be compressed and merged and the storage paths of the SST files to be compressed and merged in the second storage device.

According to an embodiment of the present disclosure, an electronic device may be provided.

Figure 9:
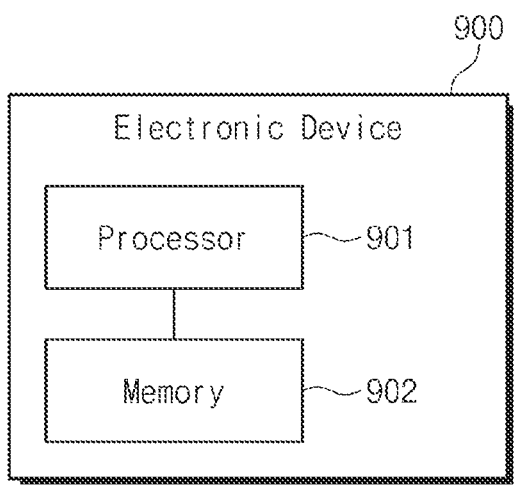
FIG. 9 is a block diagram showing an electronic device according to an embodiment of the present disclosure.

FIG. 9 is a block diagram of an electronic device according to an embodiment of the present disclosure.

Referring to FIG. 9, the electronic device 900 may include at least one memory 902 and at least one processor 901. The at least one memory 902 stores a set of computer-executable instructions. The set of computer-executable instructions, when executed by the at least one processor 901, causes the at least one processor 901 to perform the data processing method according to embodiments of the present disclosure.

The processor 901 may include, for example, a central processing unit (CPU), a programmable logic device, a dedicated processor system, a microcontroller, or a microprocessor. As an example, the processor 901 may also include an analog processor, a digital processor, a microprocessor, a multi-core processor, a processor array, a network processor, etc.

The memory 902 as a storage medium may include, for example, an operating system, a data storage module, a network communication module, a user interface module, a data processing program, and a database.

The memory 902 may be integrated with the processor 901. In addition, the memory 902 may include an independent device, such as, for example, an external disk drive, a storage array, or any other storage device that may be used by a database system. The memory 902 and the processor 901 may be operatively coupled, or may communicate with each other, for example, through an I/O port, a network connection, etc., so that the processor 901 may read data/files stored in the memory 902.

In addition, the electronic device 900 may also include a video display (such as, e.g., a liquid crystal display) and a user interaction interface (such as, e.g., a keyboard, a mouse, a touch input device, etc.). All components of the electronic device 900 may be connected to each other via a bus and/or a network.

As an example, the electronic device 900 may be a PC computer, a tablet device, a personal digital assistant, a smartphone, or other devices capable of executing the above set of instructions. Here, the electronic device 900 is not limited to a single electronic device, and may also be any device or a collection of circuits that may execute the foregoing instructions (or instruction sets) individually or jointly. The electronic device 900 may also be a part of an integrated control system or a system manager, or may be configured as a portable electronic device interconnected by an interface locally or remotely (e.g., via wireless transmission).

The structure shown in FIG. 9 is not limited thereto. For example, according to embodiments, the structure may include more or less components than those shown in the figure, or a combination of certain components, or different component arrangements.

Figure 10:
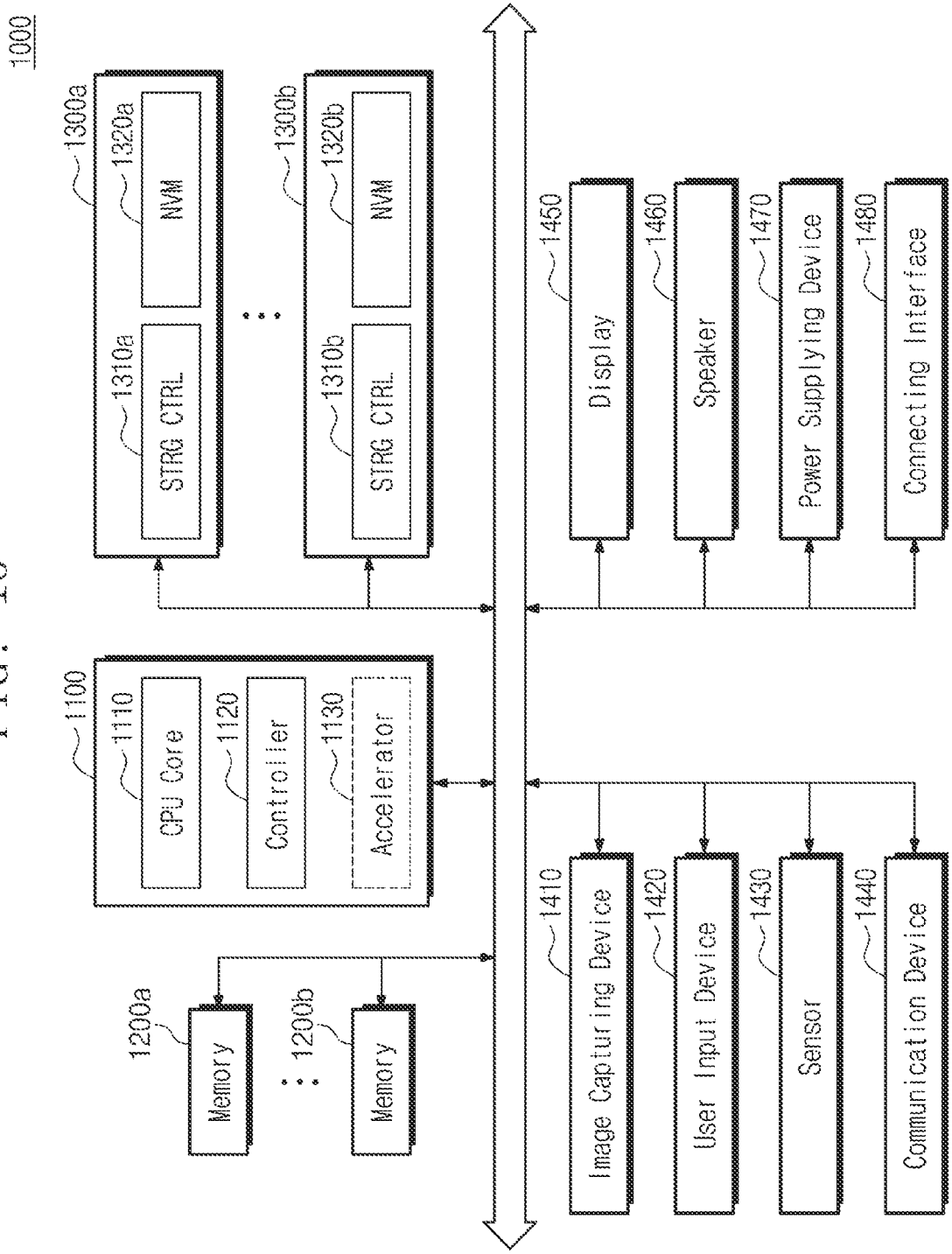
FIG. 10 is a diagram of a system to which a storage device is applied, according to an embodiment.

FIG. 10 is a diagram of a system 1000 to which a storage device is applied, according to an embodiment of the present disclosure.

The system 1000 of FIG. 10 may be, for example, a mobile system, such as a portable communication terminal (e.g., a mobile phone), a smartphone, a tablet personal computer (PC), a wearable device, a healthcare device, or an Internet of Things (IoT) device. However, the system 1000 of FIG. 10 is not necessarily limited to the mobile system and may be, for example, a PC, a laptop computer, a server, a media player, or an automotive device (e.g., a navigation device).

Referring to FIG. 10, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

In some embodiments, memories (e.g., 1200A and 1200b) and storage devices (E.G., 1300A and 1300B) may include the storage system 300 of FIG. 3. For example, memories (e.g., 1200A and 1200b) and storage devices (e.g., 1300A and 1300B) may process data according to a data processing method described with reference to at least one of FIGS. 4 to 6.

The main processor 1100 may control all operations of the system 1000 including, for example, operations of other components included in the system 1000. The main processor 1100 may be implemented as, for example, a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include, for example, a graphics processing unit (GPU), a neural processing unit (NPU) and/or a data processing unit (DPU), and may be implemented as a chip that is physically separate from the other components of the main processor 1100.

The memories 1200a and 1200b may be used as main memory devices of the system 1000. Although each of the memories 1200a and 1200b may include a volatile memory, such as, for example, static random access memory (SRAM) and/or dynamic RAM (DRAM), according to embodiments, each of the memories 1200a and 1200b may include non-volatile memory, such as, for example, a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and non-volatile memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as, for example, PRAM and/or RRAM.

The storage devices 1300a and 1300b may be physically separated from the main processor 1100 and included in the system 1000, or implemented in the same package as the main processor 1100. In addition, the storage devices 1300a and 1300b may be solid-state devices (SSDs) or memory cards, and may be removably combined with other components of the system 100 through an interface, such as the connecting interface 1480 that will be described below. The storage devices 1300a and 1300b may be devices to which a standard protocol, such as, for example, a universal flash storage (UFS), an embedded multi-media card (eMMC), or a non-volatile memory express (NVMe), is applied, without being limited thereto.

The image capturing device 1410 may capture still images or moving images. The image capturing device 1410 may include, for example, a camera, a camcorder, and/or a webcam.

The user input device 1420 may receive various types of data input by a user of the system 1000 and may include, for example, a touch pad, a keypad, a keyboard, a mouse, and/or a microphone.

The sensor 1430 may detect various types of physical quantities, which may be obtained from outside of the system 1000, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, for example, an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as, for example, advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 11:
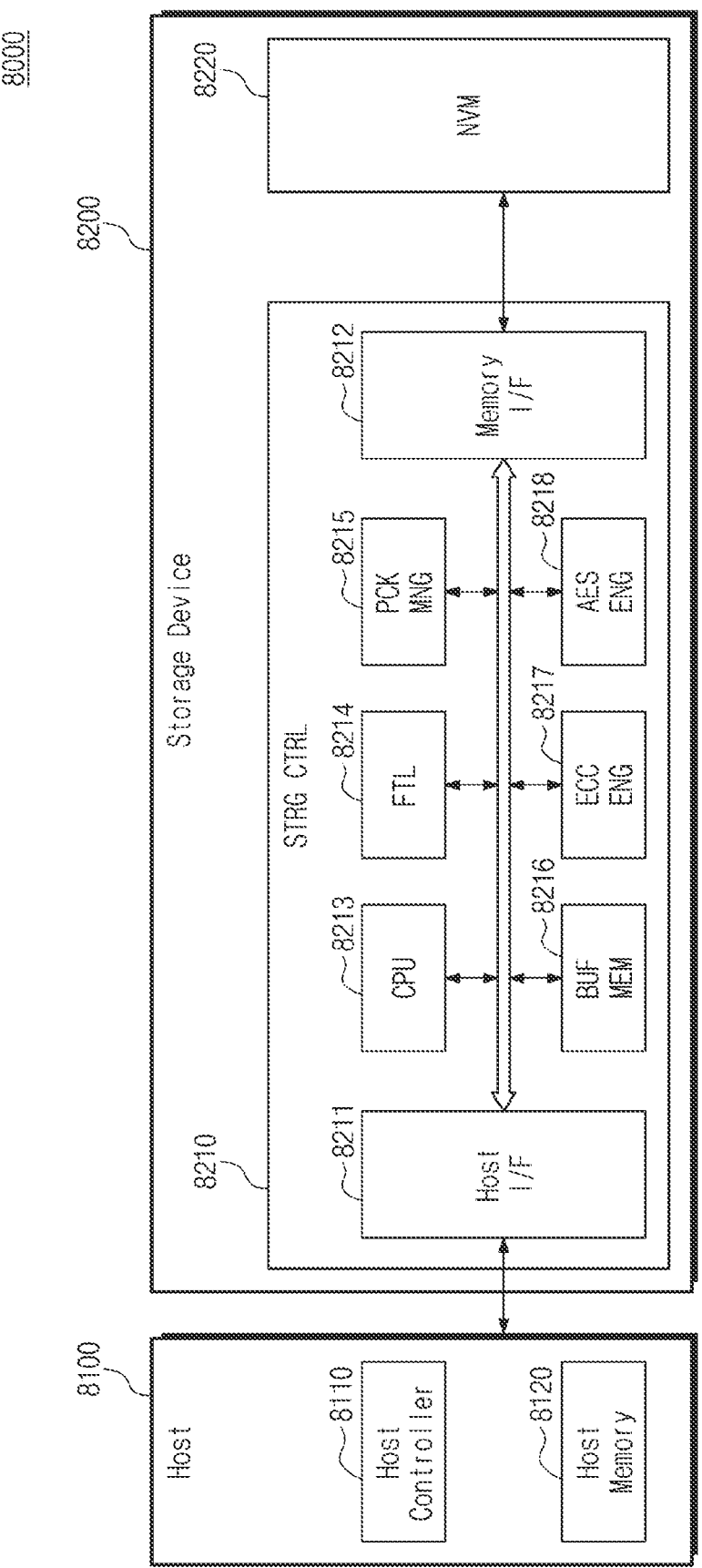
FIG. 11 is a block diagram of a host storage system according to an embodiment.

FIG. 11 is a block diagram of a host storage system 8000 according to an embodiment.

The host storage system 8000 may include a host 8100 and a storage device 8200. In addition, the storage device 8200 may include a memory controller 8210 and a NVM 8220. According to an embodiment of the present disclosure, the host 8100 may include a host controller 8110 and a host memory 8120. The host memory 8120 may be used as a buffer memory configured to temporarily store data to be transmitted to or received from the storage device 8200.

In some embodiments, the host 8100 and the storage device 8200 may correspond to the storage system 300 of FIG. 3. For example, the host 8100 and/or the storage device 8200 may perform a data processing method described with reference to at least one of FIGS. 4 to 6.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 may generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an embodiment, the host controller 8110 and the host memory 8120 may be implemented as separate semiconductor chips. Alternatively, in some embodiments, the host controller 8110 and the host memory 8120 may be integrated in the same semiconductor chip. As an example, the host controller 8110 may be any one of a plurality of modules included in an application processor (AP). The AP may be implemented as a system on chip (SOC). In addition, the host memory 8120 may be an embedded memory included in the AP or a memory module external to the AP.

The host controller 8110 may manage an operation of storing data (e.g., write data) of the buffer area of the host memory 8120 in the NVM 8220 or an operation of storing data (e.g., read data) of the NVM 8220 in the buffer area.

The memory controller 8210 may include a host interface 8211, a memory interface 8212, and a CPU 8213. In addition, the memory controller 8210 may also include a flash conversion layer (FTL) 8214, a packet manager 8215, a buffer memory 8216, an error correction code (ECC) engine 8217, and an advanced encryption standard (AES) engine 8218. The memory controller 8210 may further include a working memory in which the FTL 8214 is loaded. The CPU 8213 may execute FTL 8214 to control data write and read operations on the NVM 8220.

The host interface 8211 may send and receive packets to and from the host 8100. The packet sent from the host 8100 to the host interface 8211 may include commands or data to be written to the NVM 8220. The packet sent from the host interface 8211 to the host 8100 may include a response to a command or data read from the NVM 8220. The memory interface 8212 may send data to be written to the NVM 8220 or receive data read from the NVM 8220. The memory interface 8212 may be configured to comply with standard protocols such as toggle or open NAND flash interface (ONFI).

FTL 8214 may perform various functions, such as, for example, an address mapping operation, a wear balancing operation and a garbage collection operation. The address mapping operation may convert the logical address received from host 8100 into the physical address used to actually store data in NVM 8220. The wear balancing operation may prevent or reduce excessive degradation of specific blocks by allowing uniform use of NVM 8220 blocks. As an example, the wear equalization operation may be realized by using firmware technology to balance the erase count of physical blocks. The garbage collection operation may ensure the available capacity in NVM 8220 by erasing the existing blocks after copying the valid data of the existing blocks to the new blocks.

The packet manager 8215 may generate packets according to a protocol compatible with the interface of the host 8100, or parse various types of information from packets received from the host 8100. In addition, the buffer memory 8216 may temporarily store data to be written to or read from the NVM 8220. Although the buffer memory 8216 may be a component included in the memory controller 8210, embodiments are not limited thereto, and the buffer memory 8216 may be external to the memory controller 8210.

The ECC engine 8217 may perform error detection and correction operations on the read data read from NVM 8220. For example, the ECC engine 8217 may generate parity bits for the write data to be written to NVM 8220, and the generated parity bits may be stored in NVM 8220 together with the write data. During reading data from NVM 8220, the ECC engine 8217 may use read data and the parity bit read from NVM 8220 to correct an error in the read data, and output the read data after error correction.

The AES engine 8218 may perform at least one of an encryption operation and a decryption operation on the data input to the memory controller 8210 by using a symmetric key algorithm.

Figure 12:
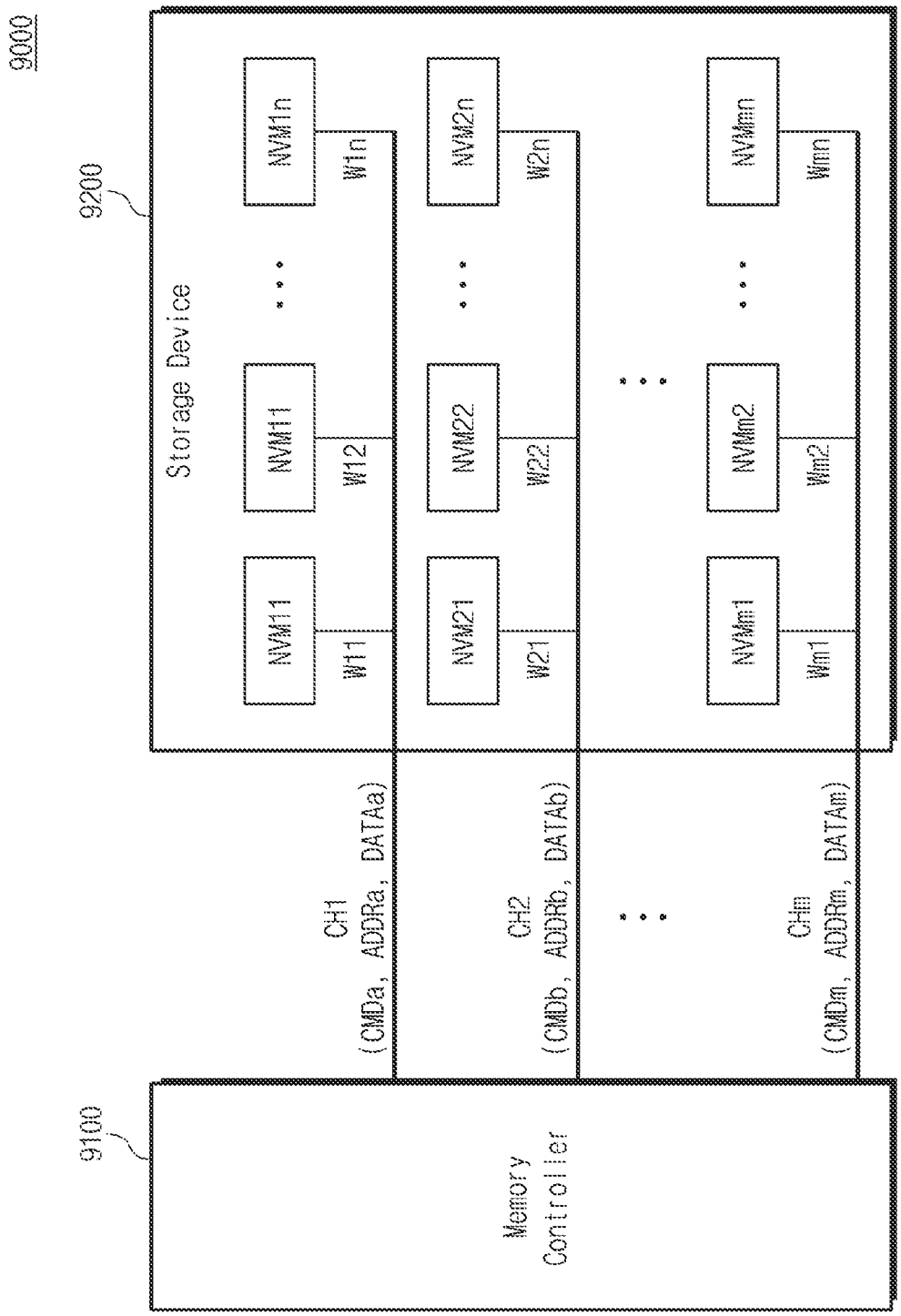
FIG. 12 is a block diagram of a storage system according to an embodiment of the present disclosure.

FIG. 12 is a block diagram of a storage system 9000 according to an embodiment of the present disclosure.

Referring to FIG. 12, the storage system 9000 may include a storage device 9200 and a memory controller 9100. The storage system 9000 may support multiple channels CH1 to CHM, and the storage device 9200 may be connected to the memory controller 9100 through multiple channels CH1 to CHM, where M is a positive integer. For example, storage system 9000 may be implemented as a storage device such as an SSD.

In some embodiments, the storage system 9000 may correspond to the storage system 300 of FIG. 3. For example, the storage system 9000 may perform a data processing method described with reference to at least one of FIGS. 4 to 6.

The storage device 9200 may include a plurality of NVM devices NVM11 to NVMmn, where m and n are positive integers. Each of the NVM devices NVM11 to NVMmn may be connected to one of the plurality of channels CH1 to CHM through its corresponding path. For example, NVM devices NVM11 to NVM1n may be connected to the first channel CH1 through paths W11 to W1n, and NVM devices NVM21 to NVM2n may be connected to the second channel CH2 through paths W21 to W2n. In an embodiment, each of the NVM devices NVM11 to NVM1n may be implemented as any storage element, which may operate according to a separate command from the memory controller 9100. For example, each of the NVM devices NVM11 to NVM1n may be implemented as a chip or die, but the present disclosure is not limited thereto.

The memory controller 9100 may send and receive signals to and from the storage device 9200 through the plurality of channels CH1 to CHM. For example, the memory controller 9100 may send commands CMDa to CMDm, addresses ADDRa to ADDRm, and data DATAa to DATAm to the storage device 9200 through channels CH1 to CHm, or receive data DATA DATAa to DATAm from the storage device 9200.

The memory controller 9100 may select one from the NVM devices NVM11 to NVMmn connected to each of the channels CH1 to CHM by using the corresponding one of the channels CH1 to CHm, and send and receive signals to and from the selected NVM device. For example, the memory controller 9100 may select the NVM device NVM11 from the NVM devices NVM11 to NVM1n connected to the first channel CH1. The memory controller 9100 may send the command CMDA, address ADDRa and data DATA to the selected NVM device NVM11 through the first channel CH1, or receive data DATA from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and data DATAb from the storage device 9200 through the second channel CH2.

The memory controller 9100 may control all operations of the storage device 9200. The memory controller 9100 may send signals to channels CH1 to CHM and control each of the NVM devices NVM11 to NVMmn connected to channels CH1 to CHm. For example, the memory controller 9100 may send a command CMDa and an address ADDRa to the first channel CH1 and control one device selected from the NVM devices NVM11 to NVM1n.

Each of the NVM devices NVM11 to NVMmn may be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDB and the address addb provided to the second channel CH2, and send the read data DATAb to the memory controller 9100.

Although FIG. 12 shows an example in which the storage device 9200 communicates with the memory controller 9100 through m channels and includes n NVM devices corresponding to each channel, the number of channels and the number of NVM devices connected to one channel may be changed.

Figure 13:
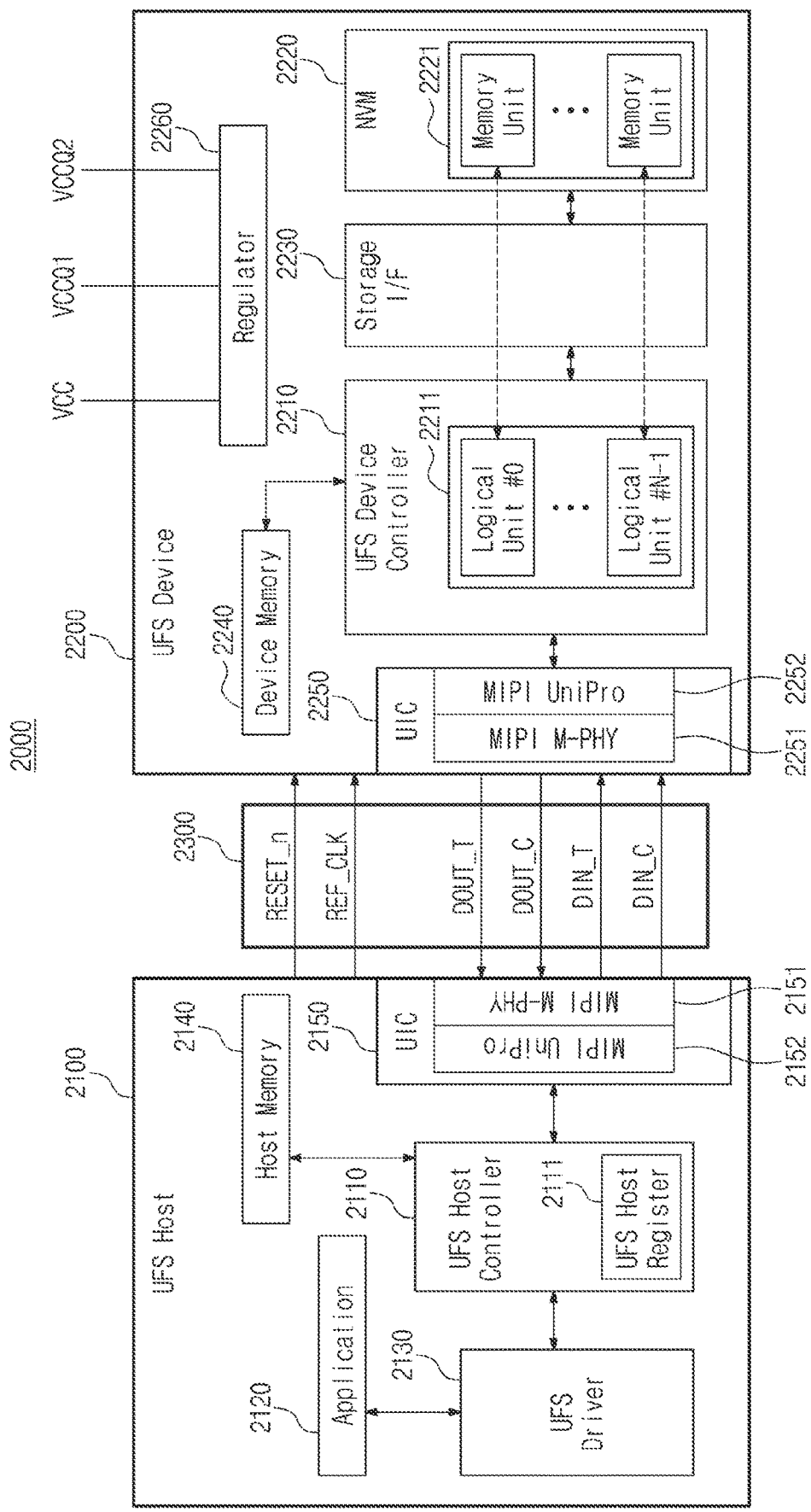
FIG. 13 is a diagram of a UFS system according to an embodiment.

FIG. 13 is a diagram of a UFS system 2000 according to an embodiment.

The UFS system 2000 may be a system conforming to a UFS standard according to the Joint Electron Device Engineering Council (JEDEC), and include a UFS host 2100, a UFS device 2200, and a UFS interface 2300. Aspects of the above description of the system 1000 of FIG. 10 may also be applied to the UFS system 2000 of FIG. 13, unless the context clearly indicates otherwise.

In some embodiments, the UFS host 2100 and/or the UFS device 2200 may correspond to the storage system 300 of FIG. 3. For example, the UFS host 2100 and/or the UFS device 2200 may perform a data processing method described with reference to at least one of FIGS. 4 to 6.

Referring to FIG. 13, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 10. The UFS device 2200 may correspond to the storage device 1300a and 1300b of FIG. 10, and a UFS device controller 2210 and an NVM 2220 may respectively correspond to the storage controllers 1310a and 1310b and the NVMs 1320a and 1320b of FIG. 10.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as, for example, PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that communicates with the UFS device 2200 to use functions of the UFS device 2200. The application 2120 may transmit input-output requests (IORs) to the UFS driver 2130 for input/output (I/O) operations on the UFS device 2200. The IORs may refer to, for example, a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of, for example, about 19.2 MHz, about 26 MHz, about 38.4 MHz, and about 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate clock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. For example, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 13, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 13, the number of transmission lanes and the number of receiving lanes are not limited thereto.

The receiving lane and the transmission lane may transmit data based on a serial communication scheme. Full-duplex communications between the UFS host 2100 and the UFS device 2200 may be enabled due to a structure in which the receiving lane is separated from the transmission lane. For example, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, in an embodiments of the present disclosure, a separate lane for data transmission is not provided in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. For example, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. The maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, embodiments of the present disclosure are not limited thereto. For example, according to embodiments, each of the memory cells may be a cell configured to store information of 2 bits or more, such as, for example, a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of about 2.4 V to about 3.6 V. The voltage VCCQ may be a power supply voltage for supplying a low voltage mainly to the UFS device controller 2210 and be in a range of about 1.14 V to about 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of about 1.7 V to about 1.95 V. The power supply voltages may be supplied through the regulator 2260 to respective components of the UFS device 2200. The regulator 2260 may be implemented as a set of unit regulators respectively connected to different ones of the power supply voltages described above.

Figure 14:
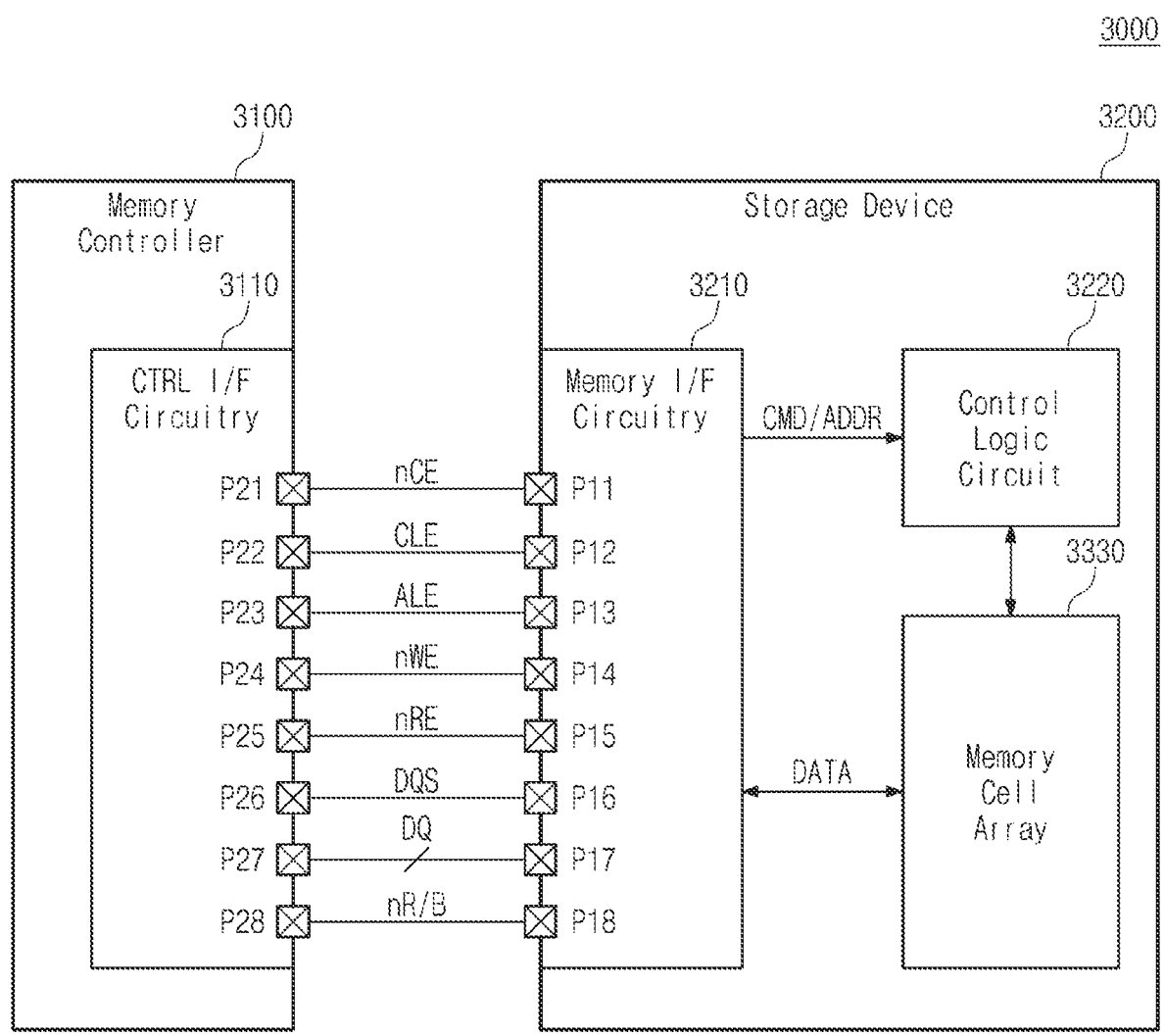
FIG. 14 is a block diagram of a storage system according to an embodiment of the present disclosure.

FIG. 14 is a block diagram of a storage system 3000 according to an embodiment of the present disclosure.

Referring to FIG. 14, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 12. The memory controller 3100 may correspond to the memory controller 9100 of FIG. 12.

In some embodiments, the storage system 3000 may correspond to the storage system 300 of FIG. 3. For example, the memory controller 3100 and/or the control logic 3220 (also referred to herein as a control logic circuit 3220) may perform a data processing method described with reference to at least one of FIGS. 4 to 6.

The storage device 3200 may include first to eighth pins P11 to P18, a memory interface circuit 3210, a control logic circuit 3220, and a storage unit array 3330.

The memory interface circuit 3210 may receive the chip enable signal nCE from the memory controller 3100 through the first pin P11. The memory interface circuit 3210 may send and receive signals to and from the memory controller 3100 through the second to eighth pins p12 to P18 in response to the chip enable signal nCE. For example, when the chip enable signal nCE is in the enable state (e.g., low level), the memory interface circuit 3210 may send a signal to and receive a signal from the memory controller 3100 through the second to eighth pins p12 to P18.

The memory interface circuit 3210 may receive a command latch enable signal CLE, an address latch enable signal ALE, and a write enable signal nWE from the memory controller 3100 through the second to fourth pins p12 to P14. The memory interface circuit 3210 may receive the data signal DQ from the memory controller 3100 through the seventh pin p17 or send the data signal DQ to the memory controller 3100. A command CMD, an address ADDR and data may be transmitted via the data signal DQ. For example, the data signal DQ may be transmitted through a plurality of data signal lines. In this case, the seventh pin p17 may include a plurality of pins corresponding to a plurality of data signals DQ, respectively.

The memory interface circuit 3210 may obtain the command CMD from the data signal DQ received in the enable interval (e.g., high-level state) of the command latch enable signal CLE based on the switching time point of the write enable signal nWE. The memory interface circuit 3210 may obtain the address ADDR from the data signal DQ received in the enable interval (e.g., high-level state) of the address latch enable signal ALE based on the switching time point of the write enable signal nWE.

In an embodiment, the write enable signal nWE may remain static (e.g., high level or low level) and switch between the high level and the low level. For example, the write enable signal nWE may be switched in the interval where the command CMD or address ADDR is sent. Therefore, the memory interface circuit 3210 may obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin p16, or may send the data strobe signal DQS to the memory controller 3100.

In the data (DATA) output operation of the storage device 3200, the memory interface circuit 3210 may receive the read enable signal nRE switched by the fifth pin p15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (e.g., tDQSRE). The memory interface circuit 3210 may transmit a data signal DQ including data DATA based on the switching time point of the data strobe signal DQS. Therefore, the data DATA may be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and data DATA. The memory interface circuit 3210 may obtain data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 may send the ready/busy output signal nR/B to the memory controller 3100 through the eighth pin P18. The memory interface circuit 3210 may transmit the status information of the storage device 3200 to the memory controller 3100 through the ready/busy output signal nR/B. When the storage device 3200 is in a busy state (e.g., when an operation is being performed in the storage device 3200), the memory interface circuit 3210 may send a ready/busy output signal nR/B indicating the busy state to the memory controller 3100.

When the storage device 3200 is in the ready state (e.g., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (e.g., low level) to the memory controller 3100. For example, when the storage device 3200 programs the data DATA to the storage unit array 3330 in response to the programming command, the memory interface circuit 3210 may send the ready/busy output signal nR/B indicating the busy state to the memory controller 3100.

The control logic 3220 may control all operations of the storage device 3200. The control logic circuit 3220 may receive a command/address CMD/ADDR obtained from the memory interface circuit 3210. The control logic 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, embodiments of the present disclosure are not limited thereto, and the storage unit may be, for example, an RRAM unit, a FRAM unit, a PRAM unit, a thyristor RAM (TRAM) unit or an MRAM unit. Hereinafter, an embodiment in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, in which the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to p24. The controller interface circuit 3110 may send or receive the data signal DQ to or from the storage device 3200 through the seventh pin p27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through an address latch enable signal ALE having an enable state to transmit a data signal DQ including an address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate a switched read enable signal nRE and send the read enable signal nRE to the storage device 3200. For example, before outputting the data DATA, the controller interface circuit 3110 may generate a read enable signal nRE from a static state (e.g., high level or low level). Therefore, the storage device 3200 may generate the switched data strobe signal DQS based on the read enable signal nRE. The controller interface circuit 3110 may receive the data signal DQ including data DATA and the switched data strobe signal DQS from the storage device 3200. The controller interface circuit 3110 may obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (e.g., high level or low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 15:
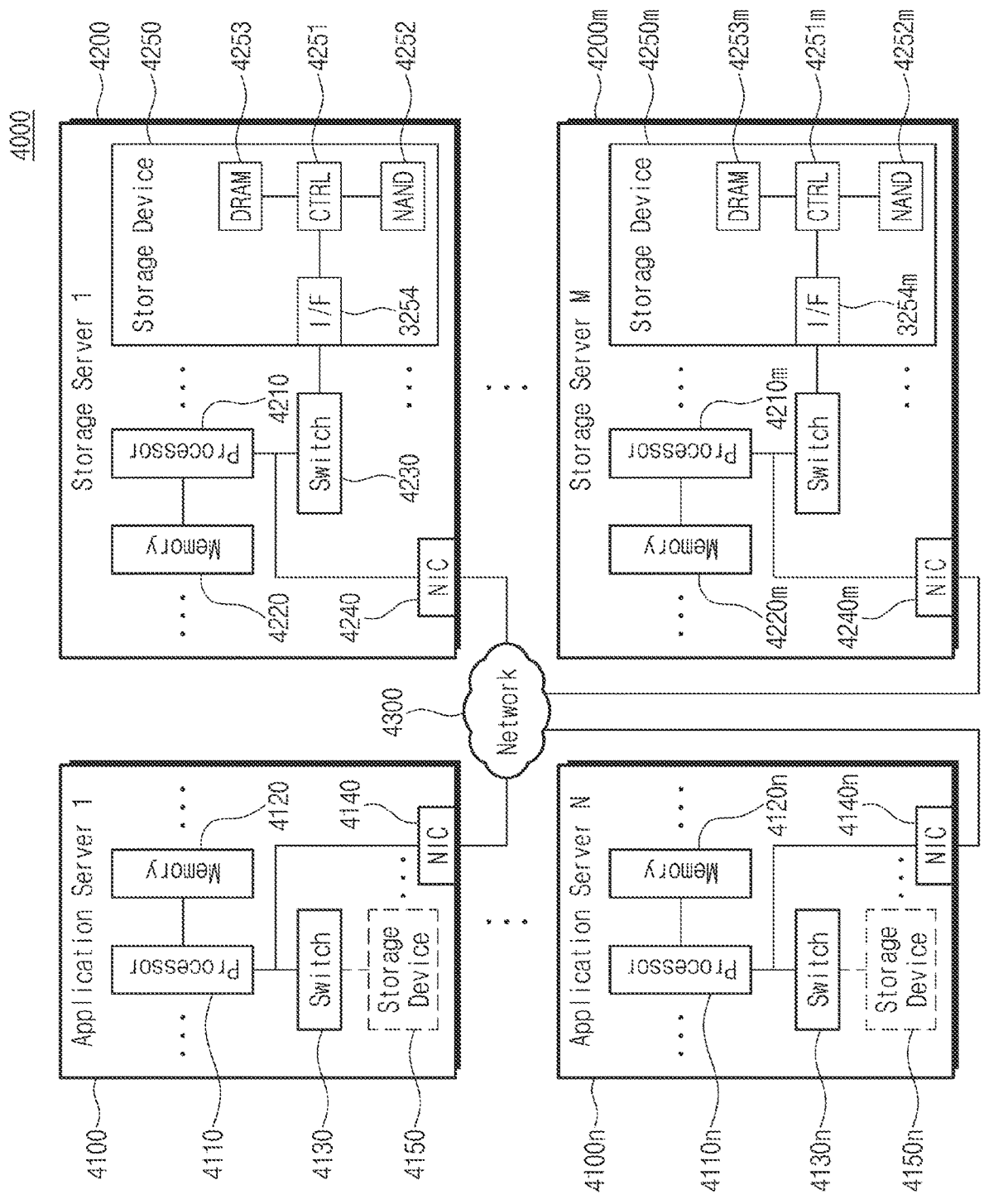
FIG. 15 is a block diagram of a data center to which a storage device is applied according to an embodiment of the present disclosure.

FIG. 15 is a block diagram of a data center 4000 to which a storage device is applied according to an embodiment of the present disclosure.

Referring to FIG. 15, the data center 4000 may be a facility for collecting various types of data and providing services, and may also be referred to as a data storage center. The data center 4000 may be a system for operating search engines and databases, and may be a computing system used by companies (such as, e.g., banks) or government agencies. The data center 4000 may include application servers 4100 to 4100n and storage servers 4200 to 4200m. According to an embodiment, the number of application servers 4100 to 4100n and the number of storage servers 4200 to 4200m may be different from each other.

In some embodiments, the storage server 4200 and/or the application server 4100 may correspond to the storage system 300 of FIG. 3. For example, the storage server 4200 and/or the application server 4100 may perform a data processing method described with reference to at least one of FIGS. 4 to 6.

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be, for example, a dual data rate synchronous DRAM (DDR SDRAM), a high bandwidth memory (HBM), a hybrid memory cube (HMC), a dual in-line memory module (DIMM), an optane DIMM, or a nonvolatile DIMM (NVMDIMM). In some embodiments, the number of processors 4210 and memory 4220 included in the storage server 4200 may be different from each other. In an embodiment, the processor 4210 and the memory 4220 may form a processor-memory pair. In an embodiment, the number of processors 4210 and the number of memories 4220 may be different from each other. The processor 4210 may include a single core processor or a multi-core processor. The above description of the storage server 4200 may be similarly applied to the application server 4100. In some embodiments, the application server 4100 does not include a storage device 4150. The storage server 4200 may include at least one storage device 4250. According to an embodiment, the number of storage devices 4250 included in the storage server 4200 may be different.

Application servers 4100 to 4100n may communicate with storage servers 4200 to 4200m through network 4300. The network 4300 may be implemented by using, for example, a fibre channel (FC) or ethernet. In this case, the FC may be a medium for relatively high-speed data transmission, and optical switches with high performance and high availability may be used. According to the access method of the network 4300, the storage servers 4200 to 4200m may be set as, for example, file storage, block storage or object storage.

In an embodiment, the network 4300 may be a network dedicated to storage, such as a storage area network (SAN). For example, a SAN may be a FC-SAN that uses an FC network and is implemented according to the FC protocol (FCP). As another example, the SAN may be an Internet Protocol (IP)—SAN, which uses a transmission control protocol (TCP)/IP network and is implemented according to SCSI over TCP/IP or Internet SCSI (iSCSI) protocol. In an embodiment, the network 4300 may be a general-purpose network, such as a TCP/IP network. For example, the network 4300 may be implemented according to protocols such as FC over Ethernet (FCoE), network attached storage (NAS), and NVMe over fabrics (NVMe-of).

Hereinafter, the application server 4100 and the storage server 4200 will be mainly described. The description of the application server 4100 may be applied to another application server 4100n, and the description of the storage server 4200 may be applied to another storage server 4200m.

The application server 4100 may store the data requested to be stored by the user or the client in one of the storage servers 4200 to 4200m through the network 4300. In addition, the application server 4100 may obtain data requested to be read by a user or a client from one of the storage servers 4200 to 4200m through the network 4300. For example, the application server 4100 may be implemented as a network server or a database management system (DBMS).

The application server 4100 may access the memory 4120n or the storage device 4150n included in another application server 4100n through the network 4300. Alternatively, the application server 4100 may access the memories 4220 to 4220m or storage devices 4250 to 4250m included in the storage servers 4200 to 4200m through the network 4300. Therefore, the application server 4100 may perform various operations on the data stored in the application servers 4100 to 4100n and/or the storage servers 4200 to 4200m. For example, the application server 4100 may execute instructions for moving or copying data between the application servers 4100 to 4100n and/or the storage servers 4200 to 4200m. In this case, data may be moved from the storage devices 4250 to 4250m of the storage servers 4200 to 4200m through the memories 4220 to 4220m of the storage servers 4200 to 4200m or directly to the memories 4120 to 4120n of the application servers 4100 to 4100n. The data moved through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, the interface 4254 may be implemented by using various interface schemes, such as ATA, SATA, E-SATA, SCSI, SAS, PCI, PCIe, NVMe, IEEE 1394, a USB interface, an SD card interface, an MMC interface, an eMMC interface, a UFS interface, an eUFS interface and a CF card interface.

The storage server 4200 may further include a switch 4230 and a network interconnect (NIC) 4240. The switch 4230 may selectively connect the processor 4210 to the storage device 4250 via the control of the processor 4210, or selectively connect the NIC 4240 to the storage device 4250.

In an embodiment, the NIC 4240 may include a network interface card and a network adapter. The NIC 4240 may be connected to network 4300 through, for example, a wired interface, a wireless interface, a Bluetooth interface or an optical interface. The NIC 4240 may include, for example, an internal memory, a digital signal processor (DSP), and a host bus interface, and is connected to the processor 4210 and/or the switch 4230 through the host bus interface. The host bus interface may be implemented as one of the above examples of interface 4254. In one embodiment, NIC 4240 may be integrated with at least one of the processor 4210, the switch 4230, and the storage device 4250.

In storage servers 4200 to 4200m or application servers 4100 to 4100n, the processor may send commands to storage devices 4150 to 4150n and 4250 to 4250m or memories 4120 to 4120n and 4220 to 4220m and program or read data. In this case, the data may be the wrong data corrected by the ECC engine. The data may be data on which a data bus inversion (DBI) operation or a data masking (DM) operation is performed, and may include cyclic redundancy coding (CRC) information. Data may be encrypted for security or privacy.

The storage devices 4150 to 4150n and 4250 to 4250m may send control signals and command/address signals to the NAND flash memory devices 4252 to 4252m in response to a read command received from the processor. Therefore, when reading data from the NAND flash memory devices 4252 to 4252m, the read enable (RE) signal may be input as the data output control signal. Therefore, the data may be output to the DQ bus. The RE signal may be used to generate the data strobe signal DQS. Depending on the rising or falling edge of the write enable (WE) signal, the command and address signals may be locked in the page buffer.

The controller 4251 may control all operations of the storage device 4250. In an embodiment, the controller 4251 may include a SRAM. The controller 4251 may write data to the NAND flash memory device 4252 in response to a write command or read data from the NAND flash memory device 4252 in response to a read command. For example, write commands and/or read commands may be provided from the processor 4210 of the storage server 4200, the processor 4210m of another storage server 4200m, or the processors 4110 and 4110n of the application servers 4100 and 4100n. The DRAM 3253 may temporarily store (or buffer) data to be written to or read from the NAND flash memory device 4252. Also, DRAM 3253 may store metadata. Here, the metadata may be user data or data generated by the controller 4251 for managing the NAND flash memory device 4252. The storage device 4250 may include a security element (SE) for security or privacy.

According to an embodiment of the present disclosure, there may also be provided a computer-readable storage medium storing instructions, wherein the instructions, when executed by at least one processor, cause the at least one processor to execute the data processing method according to the present disclosure. Examples of computer-readable storage medium here include Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

According to embodiments of the present disclosure, a computer program product may also be provided, and the instructions in the computer program product may be executed by a processor of a computer device to complete the above data processing method.

Embodiments of the present disclosure change random reading of a slow storage device into sequential reading of the slow storage device and random reading of a fast storage device with high read and write performance (e.g., high read and write speed) by utilizing the fast storage device, to efficiently utilize the sequential read performance of the slow storage device and the random read performance of the fast storage device to increase compression efficiency.

According to embodiments of the present disclosure, a compression thread is based on copies of the SST files in the fast storage device, rather than directly based on the SST files in the slow storage device. As a result, slow random reading may be replaced with fast sequential reading, thereby increasing the compression efficiency. In addition, according to embodiments of the present disclosure, the compression thread may quickly locate the data copy to be compressed in the fast storage device based on the mapping table, thereby increasing the query speed.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

The term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An operation method of data processing device for a log structured merge (LSM) tree, the operation method comprising:
    selecting sorted string table (SST) files to be compressed and merged in a current layer and a next layer,
    sequentially reading the SST files to be compressed and merged in the current layer and the next layer from a first storage device, and sequentially writing the SST files in a second storage device;
    randomly reading the SST files to be compressed and merged from the second storage device into a memory according to key sequence numbers of data blocks included in the SST files to be compressed and merged; and
    performing compression and merge processing on the SST files to be compressed and merged,
    wherein sequential and random read and write speed of the second storage device is higher than that of the first storage device.

2. The operation method of claim 1, wherein after the SST files to be compressed and merged in the current layer and the next layer are sequentially read from the first storage device and sequentially written into the second storage device, the method further comprises:
    updating storage paths of the SST files to be compressed and merged in the second storage device, in a mapping table,
    wherein randomly reading the SST files to be compressed and merged from the second storage device into the memory according to the key sequence numbers of the data blocks included in the SST files to be compressed and merged comprises:
    randomly reading the SST files to be compressed and merged from the second storage device into the memory according to the key sequence numbers of the data blocks included in the SST files to be compressed and merged, according to the storage paths of the SST files to be compressed and merged in the second storage device.

3. The operation method of claim 2, wherein the mapping table indicates a corresponding relationship between identification numbers of the SST files to be compressed and merged and the storage paths of the SST files to be compressed and merged in the second storage device.

4. The operation method of claim 1, wherein the first storage device is a magnetic disk and the second storage device is a solid state drive (SSD).

5. The operation method of claim 1, wherein sequentially reading the SST files to be compressed and merged in the current layer and the next layer from the first storage device and sequentially writing the SST files in the second storage device comprises:
    in response to a pre-read data command, sequentially reading the SST files to be compressed and merged in the current layer and the next layer from the first storage device and sequentially writing the SST files into the second storage device.

6. The operation method of claim 1, wherein the first storage device is a first NAND, and the second storage device is a second NAND faster than the first NAND.

7. A data processing device for a log structured merge (LSM) tree, the data processing device comprising:
    a selecting module configured to select sorted string table (SST) files to be compressed and merged in a current layer and a next layer;
    a prefetching module configured to sequentially read the SST files to be compressed and merged in the current layer and the next layer from a first storage device and sequentially write the SST files in a second storage device; and
    a reading module configured to randomly read the SST files to be compressed and merged from the second storage device into a memory according to key sequence numbers of data blocks included in the SST files to be compressed and merged, and perform compression and merge processing on the SST files to be compressed and merged,
    wherein sequential and random read and write speed of the second storage device is higher than that of the first storage device.

8. The data processing device of claim 7, wherein the data processing device further comprises:
    a mapping table module configured to update storage paths of the SST files to be compressed and merged in the second storage device in a mapping table, wherein the reading module is further configured to:
randomly read the SST files to be compressed and merged from the second storage device into the memory according to the key sequence numbers of the data blocks included in the SST files to be compressed and merged, according to the storage paths of the SST files to be compressed and merged in the second storage device.

9. The data processing device of claim 8, wherein the mapping table module is further configured to store a corresponding relationship between identification numbers of the SST files to be compressed and merged and the storage paths of the SST files to be compressed and merged in the second storage device.

10. The data processing device of claim 7, wherein the first storage device is a magnetic disk and the second storage device is a solid state drive (SSD).

11. The data processing device of claim 10, wherein the prefetching module is further configured to:
in response to a pre-read data command, sequentially read the SST files to be compressed and merged in the current layer and the next layer from the first storage device and sequentially write the SST files into the second storage device.

12. The operation device of claim 7, wherein the first storage device is a first NAND, and the second storage device is a second NAND faster than the first NAND.

13. A storage system comprising:
a first storage device storing a first file and a second file;
a second storage device faster than the first storage device;
a memory; and
a data processing module configured to:
perform sequentially read operation for the first and second files from the first storage device,
perform sequentially write operation for the first and second files into the second storage device sequentially, and
perform random read operation for the first and second files from the second storage device into the memory based on key sequence of the first and second files.

14. The storage system of claim 13, wherein:
the first file includes a first block and a second block;
the second file includes a third block and a fourth block; and
the data processing module is further configured to read the third block into the memory between the first block and the second block.

15. The storage system of claim 13, wherein the first storage device is a magnetic disk and the second storage device is a solid state drive (SSD).

16. The storage system of claim 13, wherein the first storage device is a first NAND, and the second storage device is a second NAND faster than the first NAND.

17. The storage system of claim 13, wherein a first size of the first and second files read into the memory is smaller than the second size of the first and second files stored in the first storage device.

18. The storage system of claim 13, wherein the first and second files are included in a log structured merge (LSM) tree.

19. The storage system of claim 13, wherein a type of the first and second files is a sorted string table (SST).

* * * * *